United States Patent [19]

Muranoi

[11] Patent Number: 5,179,628
[45] Date of Patent: Jan. 12, 1993

[54] COMPUTER INTERFACE BETWEEN I/O CHANNEL UNIT AND SERVICE PROCESSING UNIT

[75] Inventor: Takeshi Muranoi, Kanagawa, Japan

[73] Assignee: Mitsubishi Denki Kabushiki Kaisha, Japan

[21] Appl. No.: 830,994

[22] Filed: Feb. 5, 1992

Related U.S. Application Data

[63] Continuation of Ser. No. 342,477, Apr. 24, 1989, abandoned.

[30] Foreign Application Priority Data

Jun. 10, 1988 [JP] Japan .................................. 63-142886

[51] Int. Cl.⁵ .......................................... G06F 13/00
[52] U.S. Cl. ............................ 392/325; 364/DIG. 2;
364/927.99; 364/935.44; 364/935.51;
364/940.63; 364/260.1; 364/239.9; 364/238.3
[58] Field of Search .................. 395/325; 364/DIG. 2

[56] References Cited

U.S. PATENT DOCUMENTS

| | | | |
|---|---|---|---|
| 3,828,326 | 8/1974 | Cash | 364/200 |
| 4,390,963 | 6/1983 | Puhl et al. | 364/200 |
| 4,481,574 | 11/1984 | DeFino et al. | 364/200 |
| 4,485,439 | 11/1984 | Rothstein | 364/200 |
| 4,649,512 | 3/1987 | Nukiyama | 364/900 |
| 4,734,853 | 3/1988 | Nakano | 364/200 |

Primary Examiner—Eddie P. Chan
Attorney, Agent, or Firm—Wolf, Greenfield & Sacks

[57] ABSTRACT

An interface system for use with an electronic computer including a CPU, a main memory, an input/output channel unit to which a group of latches is connected by a ring transmitting path and adapted to serve as a serial register, and a service processing unit including an operator's console control unit for performing a resetting operation or the like for each of such units, wherein the service processing unit affords read/write operations of data transmitted from the serial register by itself, and which is characterized by an additional console shift register provided in the input/output channel unit, which allows an interface to be implemented between the input/output channel unit and the operator's console control unit by the reading/writing of data into and from the console shift register.

4 Claims, 6 Drawing Sheets

COMPUTER INTERFACE BETWEEN I/O CHANNEL UNIT AND SERVICE PROCESSING UNIT

This application is a continuation, of application Ser. No. 342,477, filed Apr. 24, 1980 now abandoned.

BACKGROUND OF THE INVENTION

The present invention relates to an interface system for an electronic computer, and more particularly to an interface system disposed between a service processing unit for resetting operations undertaken within an electronic computer and for control of an operator's console unit and an input/output channel unit.

Figure 3:
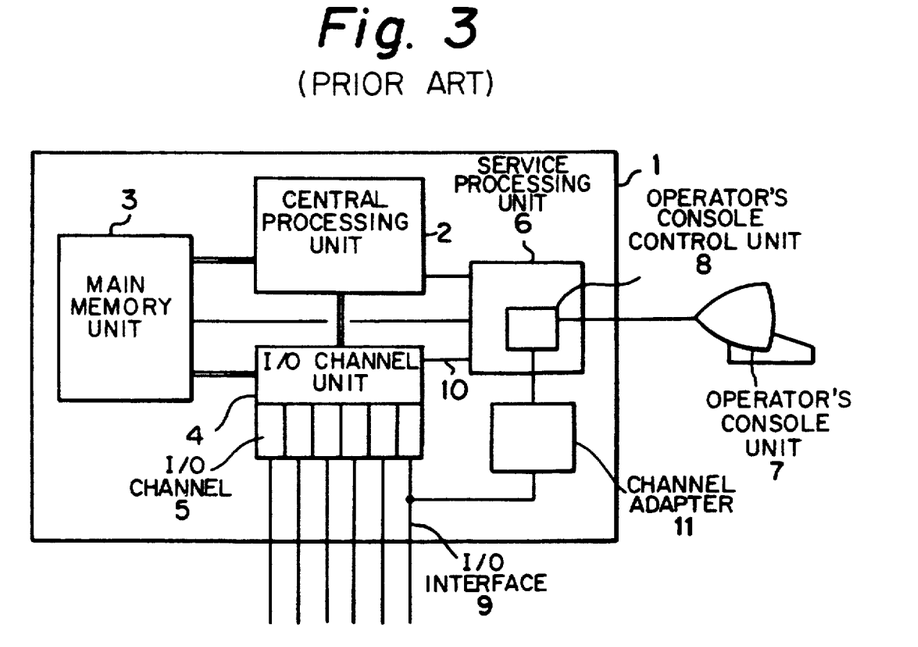
FIG. 3 is a schematic view showing a typical form of construction of a conventional interface system.
Figure 4:
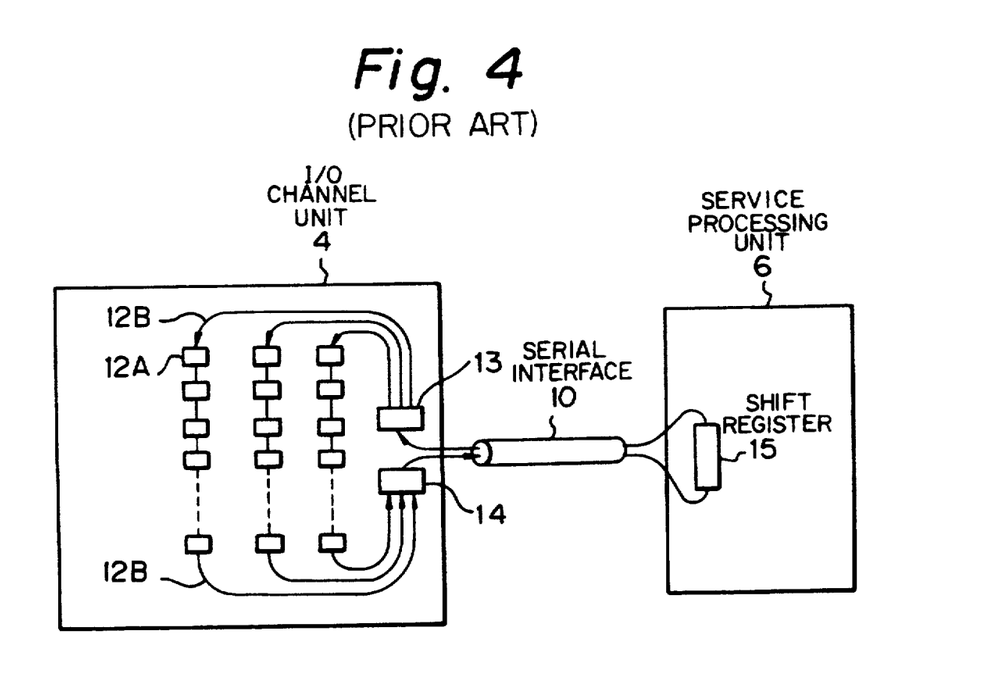
FIG. 4 is a fragmentary view showing in detail the construction of an input/output channel unit of the type shown in FIG. 3.

FIG. 3 shows the general construction of the inside of a typical conventional electronic computer. In the drawing are shown an electronic computer designated by reference numeral 1, a central processing unit (CPU) 2, a main memory 3, an input/output channel unit 4, an individual input/output channel 5, a service processing unit 6, an operator's console unit serving as a console input/output device 7, an operator's console control unit 8 which is incorporated in the service processing unit 6, an input/output interface 9 adapted to connect the input/output channel 5 and the input/output device, a serial interface 10 for connecting the input/output channel unit and the service processing unit 6, and a channel adapter unit 11 for connecting the input/output channel 5 and the operator's console control unit 8. FIG. 4 shows a typical conventional mechanism in which a group of latches comprising the input/output channel unit 4 can be at choice read and written via the service processing unit 6. In the drawing are shown an individual latch designated by reference numeral 12A which comprises a shift register of the input/output channel unit, a ring transmitting path 12B for connecting the latches, a ring transmitting terminal select unit 13 for selecting one of the plurality of ring transmitting paths to send data, a ring receiving terminal select unit 14 for selecting one of the ring transmitting paths to receive data, and a shift register 15.

The operation of such an interface system will now be explained.

With an arrangement such as that noted above, when an input/output operation is conducted at the operator's console unit 7 for processing by the CPU2, the CPU2 first operates to activate an input/output operation at the input/output channel unit 4, and then said input/output channel unit 4 selects corresponding input/output channel 5 and activates an input/output operation at the operator's console control unit 8 by way of the input/output interface 9 and the channel adapter unit 11. The input/output operation at the operator's console unit 7 is commenced in this way. It is also seen that a data transfer operation may take place with a path consisting of the operator's console unit 7, the operator's console control unit 8, the channel adapter unit 11, the input/output interface 9, the input/output channel 5, and the main memory 3, in that order or in the opposite order.

On the other hand, when the service processing unit 6 serves to read or write the group of latches which comprise the input/output channel unit 4 for the purpose of a resetting operation or the like, the serial interface 10 will be used. According to the arrangement shown in FIG. 4, when reading a latch 12A, a ring transmitting path 12B may be selected by way of the ring receiving terminal select unit 14, applying shift clocks to serially transfer the content of the latch 12A to the shift register 15. Also, when writing into the latch 12A, a ring transmitting path 12B may be selected by way of the ring transmitting terminal select unit 13 while having data prepared in advance to be written in the shift register 15, applying shift clocks to serially transfer the content of the shift register 15 to the latch 12A.

With such a typical construction of the conventional computer interface system as that noted above, it is essential to provide an interface circuit such as a channel adapter unit or the like as in other input/output devices between an operator's console control unit and an input/output channel unit, which accordingly, should then be connected to an input/output interface cable.

The present invention is essentially directed to resolution of the above mentioned problems, and it is an object of the invention to provide an improved interface system which allows a channel adapter unit and an input/output interface cable for the operator's console control unit which is incorporated in the service processing unit to be dispensed with.

SUMMARY OF THE INVENTION

According to one aspect of the present invention, there is provided an interface system which comprises an additional console shift register with an input/output channel unit, which is characterized in that an interface between the input/output channel unit and the operator's console control unit in the service processing unit may be implemented by the reading/writing of data from and into the shift register for the above mentioned console.

More specifically, the arrangement is such that when the service processing unit outputs data into the input/output channel unit from the operator's console control unit, a data write operation may be performed by shifting the console shift register within the input/output channel unit. Now, when inputting data from the input/output channel unit into the operator's console control unit, a data read operation may be conducted by shifting the console shift register within the input/output channel unit. With such an arrangement, an interface may be implemented between the operator's console control unit and the input/output channel unit by the operation of reading/writing data from and into the shift register which is conducted by the service processing unit.

According to the present invention, an additional console shift register is provided within the input/output channel unit, wherein an interface may be implemented between the input/output channel unit and the operator's console control unit by the operation of reading/writing data from and into the above mentioned console shift register, and this arrangement allows various advantages to be attained in that not only a channel adapter unit included in the service processing unit for the operator's console control unit but also an input/output interface cable may be dispensed with.

Other aspects and advantages of the present invention will become apparent from the following detailed description when considered in conjunction with the accompanying drawings.

DETAILED DESCRIPTION OF THE INVENTION

In order that the present invention may be clearly understood, preferred embodiments will be described by way of example with reference to the accompanying drawings, wherein like parts are designated by like reference numerals, and detailed description of such part will not be repeated.

Figure 1:
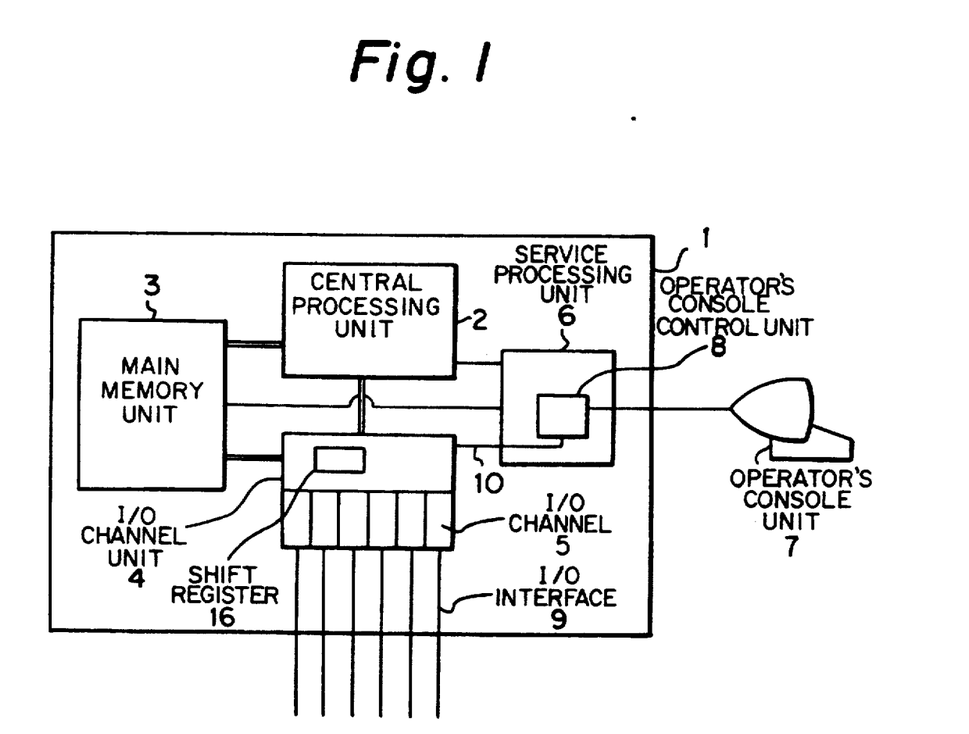
FIG. 1 is a schematic view showing the general construction of a preferred embodiment of the present invention.
Figure 2:
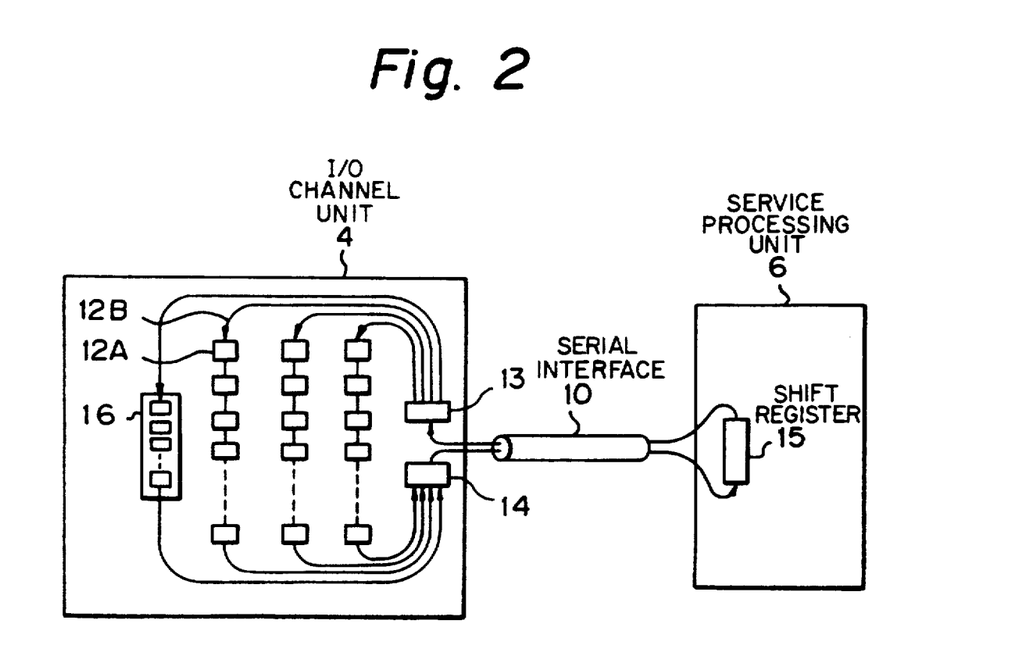
FIG. 2 is a fragmentary view showing in detail a console shift register of the type shown in FIG. 1.

Referring first to FIG. 1 which shows a preferred embodiment of the invention, a console shift register 16 is incorporated in an input/output channel unit 4. FIG. 2 is a fragmentary view showing in detail this shift register 16 which comprises a group of latches connected operatively by way of ring transmitting paths.

The operation of the improved interface system of the invention will next be explained.

When the CPU2 is operated to process the input/output operations at the operator's console unit 7, the arrangement is such that the CPU2 activates an input/output operation at the input/output channel unit 4, and then the input/output channel unit 4 activates an input/output operation at the operator's console control unit 8 by way of the serial interface 10. In this manner, the operator's console unit 7 may commence its input/output operations. It is seen that a data transfer operation may take place passing along a path consisting of the operator's console unit 7, the operator's console control unit 8, the serial interface 10, the input/output channel unit 4, and the main memory 3, in that order or in the opposite order.

An input/output command and write data to be transferred from the input/output channel unit 4 to the operator's console control unit 8, as well as read data and status to be transferred from the operator's console control unit 8 to the input/output channel unit 4, are all transferred serially by using the shift register 15 and the console shift register 16. More specifically, the arrangement is such that when data is read from the console shift register 16, this is conducted by selecting a ring transmitting path connecting the console shift register 16 by way of the ring receiving terminal select unit 14, applying shift clocks so that the data is taken into the shift register 15 accordingly, and that when data is written into the console shift register 16, this is conducted by selecting a ring transmitting path connecting the console shift register 16 by way of the ring transmitting terminal select unit 13, applying shift clocks to serially transfer the contents of the shift register 15 to the console shift register 16.

Figure 5:
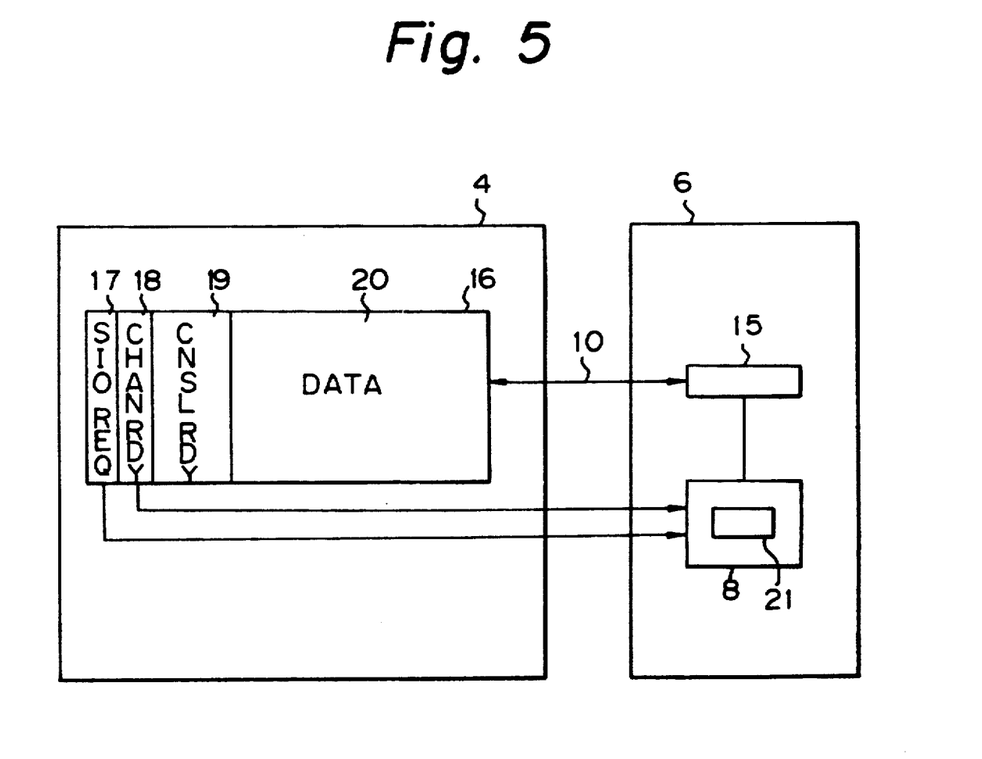
FIG. 5 is a schematic view showing a preferred embodiment of a bit format for a console shift register according to the present invention.
Figure 6:
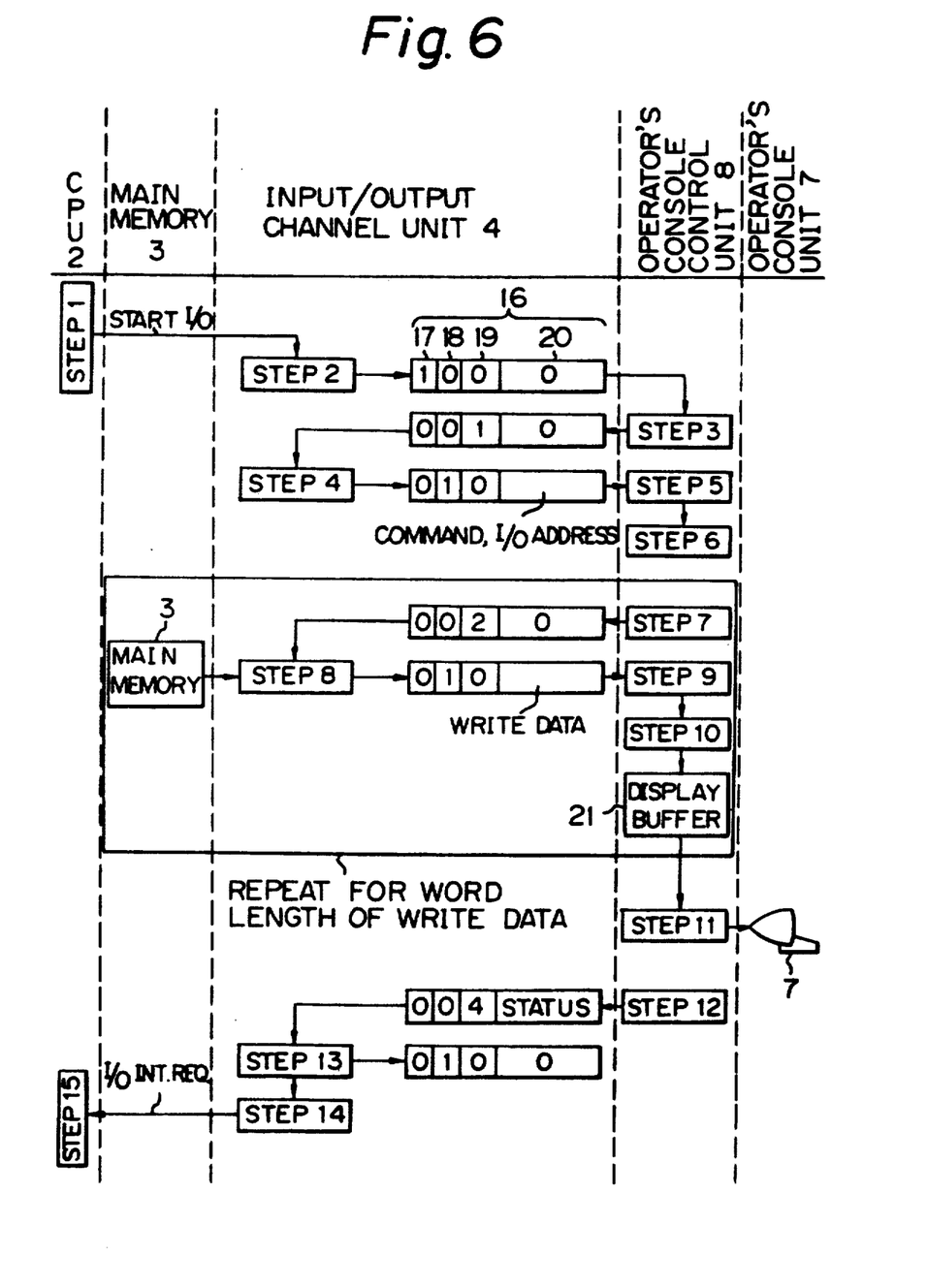
FIG. 6 is a flow diagram of the system according to the present invention.

FIG. 5 shows a preferred embodiment of a bit format for a console shift register 16 according to the present invention, and FIG. 6 shows the flow of operations in this embodiment of the invention. Referring to FIG. 5, reference numeral 17 denotes a start I/O request bit for an input/output channel unit 4 for transmitting an input/output operation request to an operator's console control unit 8, 18 denotes a channel ready bit for the input/output channel unit 4 adapted to report to the operator's console control unit 8 that data transmission is ready and/or that receipt has been completed by the console shift register 16, 19 denotes a 3-bit length console ready field for the operator's console control unit 8 adapted to report to the input/output channel unit 4 that data transmission and/or receipt to and from the console shift register 16 is ready, and 20 denotes a 32-bit length date field for receiving and transmitting information between the input/output channel unit 4 and the operator's console control unit 8.

Now, assume that the start I/O request bit 17 and the channel ready bit 18 are adapted to be transferred via separate lines from the input/output channel unit 4 to the operator's console control unit 8, respectively. The console ready field 19 can report to the input/output channel unit 4 by using codes X'n' for the relevant purpose, i.e. whether it is a data transmission or receipt which is being effected by the console shift register 16. This code may be such that it is "Not Ready" when the code X'0' is used, "Command and I/O Address Receipt Ready" when the code X'1' is used, "Data Receipt Ready" when the code X'2' is used, "Data Transmission Ready" when the code X'3' is used, and "Status Transmission Ready" when the code X'4' is used.

When the console shift register 16 is being shifted by the service processing unit 6, the operation of read/write from and to the console shift register 16 by the input/output channel unit 4 is inhibited, while it is permitted when the shift operation is completed. Also shown are a display buffer designated by 21, the operator's console control unit 8 being adapted to transfer data between this display buffer 21 and the input/output channel unit 4.

Next, referring to FIG. 6, CPU 2 is shown adapted to firstly issue a start I/O instruction to the input/output channel unit 4 for an input/output operation at the operator's console control unit (Step 1). The input/output channel unit 4 operates to report to the operator's console control unit 8 by way of the start I/O request bit 17 that an input/output operation request is pending (Step 2). In response to this, the operator's console control unit 8 writes into a shift register 15 a console ready field code X'1' which means "Command and I/O Address Receipt Ready", and applying shift clocks transmits it to the console shift register 16 (Step 3). The input/output channel unit 4 operates, in response to this, to write a command and an I/O address into a data field 20, and sets a channel ready bit 18 (Step 4). Then, in response to this, the operator's console control unit 8 applies shift clocks to get the content of the console shift register 16 received by the shift register 15 (Step 5). The specified operator's console unit 8 may now be selected using the I/O address thus received, thereby starting the execution of the received command (Step 6).

If this is a "WRITE" command, the operator's console control unit 8 will then write the console ready field code X'2' meaning "Data Receipt Ready" into the shift register 15, which code is then transmitted to the console shift register 16 by way of shift clocks (Step 7). In response to this, the input/output channel unit 4 will then operate to fetch from the main memory 3 the appropriate data, write the data into the data field 20, and sets the channel ready bit 18 (Step 8). The operator's console control unit 8 will, in response to this, get the content of the console shift register 16 received by the shift register 15 by way of shift clocks (Step 9). Then, the thus-received WRITE data is written into the display buffer 21 (Step 10). Steps 7 through 10 in FIG. 6 are repeated for a required word length of WRITE data.

While not shown in FIG. 6, if it is a READ command, the operator's console control unit 8 operates to take one word at a time from the display buffer 21, which is as a data field to be written into the shift register 15, and then also writes a console ready field code X'3' meaning "Data Transmission Ready" into the shift register 15, which are both to be transmitted to the shift register 15 by way of shift clocks. The input/output channel unit 4 will in response to this take data from the data field 20, setting the channel ready bit 18 reporting to the operator's console control unit 8 that the date has been received. The input/output channel unit 4 will further operate to store the thus-received data in the main memory 3. This series of operations may be repeated for a required word length of READ data.

Now, when the data transfer operation is completed, and if it is a WRITE command, the content of the display buffer 21 may then be transmitted to the operator's console unit 7, which will then display a frame (Step 11).

Next, the operator's console control unit 8 operates to write a status information meaning "End of Command" as a data field into the shift register 15, and also a console ready field code X'4' showing "Status Transmission Ready" into the shift register 15, transmitting it to the console shift register 16 by way of shift clocks (Step 12). Now, the input/output channel unit 4 will, in response to this, take this status information from the data field 20, setting the channel ready bit 18, to report to the operator's console control unit 8 the receipt of this status information (Step 13). Thereafter, the input/output channel unit 4 operates to report by way of an input/output interrupt request showing the received status information to the CPU 2 that the input/output operation has been completed (Step 14). The CPU 2 may operate to perform an input/output interrupt, if this interrupt is enabled.

According to the preferred embodiment stated above, the operator's console unit is only connected as a console input/output unit to the operator's console control unit. However, it is of course possible to have any other input/output unit such as a console printer or the like connected to it with equal effect.

It is to be understood that the appended claims are intended to cover all of such generic and specific features as are particular to the invention as disclosed herein and all statements relating to the scope of the invention which as a matter of language might be said to fall thereunder.

What is claimed is:

1. An interface system for use in an electronic computer which includes a central processing unit, a main memory unit, an input/output channel unit, and a service processing unit, said input/output channel unit having a plurality of channels and a respectively corresponding plurality of channel serial registers, each of said channel serial registers storing status signals, comprising a plurality of stages, and connected via a ring transmitting path;

said service processing unit including a service serial register, and an operator's console control unit for controlling a console input/output unit, said operator's console control unit having means for controlling said service serial register, said interface system further including status signal read/write means for reading or writing status signals by shifting the status signals between said service serial register and said plurality of channel serial registers;

characterized in that said interface system performs a data transfer operation and further includes:

a data serial register for storing data information in said input/output channel unit, said data serial register comprising a plurality of stages and connected via the ring transmitting path, memory data transfer means for transferring data between said data serial register and said main memory unit, and service data interface means for connecting said data serial register to said status read/write means so as to enable the transfer of data information between said data serial register and said service serial register so that the read/write means for transferring status between the service serial register and the channel serial register is also used as a path for transferring data information between the service serial register and the data serial register.

2. An interface system as claimed in claim 1, wherein said status signal read/write means includes a serial bus and status control means for controlling the transfer of information over said serial bus, and said memory data transfer means includes a parallel bus and memory data control means for controlling the transfer of data over said parallel bus.

3. An interface system for use in an electronic computer which includes a central processing unit, a main memory unit, an input/output channel unit, and a service processing unit, said input/output channel unit having a plurality of channels and a respectively corresponding plurality of channel shift registers, each of said channel shift registers comprising a plurality of stages connected via a ring transmitting path;

said service processing unit including a service shift register and an operator's console control unit for controlling a console input/output unit, said operator's console control unit having means for controlling said service shift register, said interface system further including status signal shifting means for reading or writing status signals by shifting the status signals between said service shift register and said plurality of channel shift registers;

characterized in that said interface system performs a data transfer operation and further includes:

a data shift register for storing data information in said input/output channel unit, said data shift register comprising a plurality of stages and connected via the ring transmitting path, memory data transfer means for transferring data between said data shift register and said main memory unit, and service data interface means for connecting said data shift register to said status read/write means so as to enable the transfer of data information between said data shift register and said service shift register so that the status signal shifting means for transferring status between the service shift register and the channel shift register is also used as a path for transferring data information between the service shift register and the data shift register.

4. An interface system as claimed in claim 3, wherein said status signal shifting means includes a serial bus and status shifting controls means for controlling the shifting of information over said serial bus, and said memory data transfer means includes a parallel bus and memory data control means for controlling the transfer of data over said parallel bus.

* * * * *